US006295566B1

(12) United States Patent
Stufflebeam (10) Patent No.: US 6,295,566 B1
(45) Date of Patent: Sep. 25, 2001

(54) PCI ADD-IN-CARD CAPABILITY USING PCI-TO-PCI BRIDGE POWER MANAGEMENT

(75) Inventor: Kenneth W. Stufflebeam, Spring, TX (US)

(73) Assignee: Campaq Computer Corporation, Houston, TX (US)

( * ) Notice: Subject to any disclaimer, the term of this patent is extended or adjusted under 35 U.S.C. 154(b) by 0 days.

(21) Appl. No.: 09/183,953

(22) Filed: Oct. 31, 1998

(51) Int. Cl.$^7$ ..................................................... G06F 13/00
(52) U.S. Cl. ........................ 710/103; 710/102; 710/101; 713/324
(58) Field of Search ..................................... 710/101–103, 710/126–129, 107, 110, 240; 713/330, 340, 324, 322, 601

(56) References Cited

U.S. PATENT DOCUMENTS

| | | | |
|---|---|---|---|
| 5,815,647 | * | 9/1998 | Buckland et al. ........................ 714/3 |
| 5,901,292 | * | 5/1999 | Nishigaki et al. ..................... 710/103 |
| 5,918,028 | * | 6/1999 | Silverthorn et al. .................. 710/129 |
| 5,922,060 | * | 7/1999 | Goodrum .............................. 710/103 |
| 6,035,355 | * | 3/2000 | Kelley et al. ......................... 710/101 |
| 6,061,752 | * | 5/2000 | Jones et al. ........................... 710/103 |
| 6,065,081 | * | 5/2000 | Stancil et al. ......................... 710/104 |
| 6,070,207 | * | 5/2000 | Bell ...................................... 710/103 |
| 6,073,196 | * | 6/2000 | Goodrum et al. .................... 710/103 |
| 6,105,090 | * | 8/2000 | Fosmo .................................. 710/103 |
| 6,141,711 | * | 10/2000 | Shah et al. ............................ 710/103 |

OTHER PUBLICATIONS

PCI Special Interest Group, "PCI Bus Power Management Interface Specification", Version 1.0, Final, Jun. 30, 1997, Chapters 2, 5, and 6.

PCI Special Interest Group, "PCI Local Bus Specification," Production Version, Revision 2.0, Apr. 30, 1993, Chapters 4–5–5, 9, 10, 11, and 13–13.3.

* cited by examiner

Primary Examiner—Robert Beausoleil
Assistant Examiner—Raymond N Phan
(74) Attorney, Agent, or Firm—Akin, Gump, Strauss, Hauer & Feld, LLP (57) ABSTRACT

A computer which has an ACPI compliant PCI-to-PCI bridge allows additional devices to be inserted, and allows existing devices to be removed or relocated without restarting the computer. A first PCI bus serves as a local bus, allowing a number of devices, including a PCI-to-PCI bridge, to be connected to the processor of a computer system. The first PCI bus also provides power and a clock signal to the PCI-to-PCI bridge and to various other PCI devices located in slots on the bus. The voltage level of the supplied power is controlled by software running on the processor. based on information obtained from the devices during power-up. The PCI-to-PCI bridge allows expansion by coupling a second PCI bus to the first PCI bus, via the PCI-to-PCI bridge. The second PCI bus includes a number of PCI slots, one of which is coupled to the PCI-to-PCI bridge and receives clock and power signals from the PCI-to-PCI bridge. Other devices may be connected to the second PCI bus by inserting the additional devices into slots in the second PCI bus. Additional PCI buses may be connected to the first and second PCI buses by inserting additional PCI-to-PCI bridges into slots in the PCI buses. Only one PCI bridge subsystem need be disabled, i.e. the one to which the new device is to be added or from which a preexisting device is to be removed.

12 Claims, 4 Drawing Sheets

PCI ADD-IN-CARD CAPABILITY USING PCI-TO-PCI BRIDGE POWER MANAGEMENT

BACKGROUND OF THE INVENTION

1. Field of the Invention

The present invention relates to a computer system having a PCI bus, and more specifically to expansion of a PCI-to-PCI bridge subsystem of a computer system.

2. Description of the Related Art

Computer systems often include a large number of peripheral devices and other components distributed on one or more buses. The Peripheral Component Interconnect (PCI) bus, a local bus standard developed by Intel Corporation and the PCI Special Interest Group, is one of the industry's most prevalent buses and a de facto standard. Because PCI allows independent bus mastering off the main processor, data rates are enormously increased over other bus standards since many processes can be off-loaded to bus masters other than the processor.

The ease of processing parallelism inherent in PCI bus systems has lead many product manufacturers to support PCI. PCI devices, fabricated on PCI expansion cards, have been manufactured independently of the processor and of the endian scheme. Many new products are fabricated on insertable cards, which a user inserts into a computer system by identifying a vacant slot in a bus, powering down the computer system inserting the card, and powering back up the computer system to allow the configuration of the new device. The PCI bus approach allows expansion of computer systems by insertion of cards or other components into slots on one of the buses. The processor local bus is typically a high-speed bus on which the CPU, main memory, and other vital components are connected. Devices on one PCI bus can communicate with devices on another PCI bus via a bridge connecting the respective buses.

PCI allows a tree-like device distribution in which one or more PCI buses are connected by PCI bridges to a processor local bus. PCI also allows straightforward operating system configuration, as each PCI bus systems configure (i.e., assign resources to) devices to allow the devices to communicate with the processor. PCI configuration is automatic upon power-up; in fact, autoconfiguration is one of the significant advantages of the PCI approach. Traditionally, however, the configuration typically occurs only at power up, to prevent the system from having to poll slots and configure devices as a background task, and from requiring a dedicated interrupt. Because resources are limited, hot or dynamic reconfiguration typically does not allow insertion of new devices of unknown type into PCI bus slots. Therefore, power must be disabled to the computer system when a PCI card is inserted, removed, or moved from one slot to another. Each PCI device, including PCI-to-PCI bridges, contains 64 double-word registers of configuration space. The first 16 doublewords are reserved for a configuration header, including a vendor identifier and device type. The remaining 48 doublewords are available for device-specific features. Upon power-up, the configuration software scans the PCI bus to determine what devices are actually present. The configuration software attempts to read a vendor identifier from each device; empty slots return the digital code FFFFh as an identifier. Valid vendor ID's cause the software to read other registers on the device, including device type. The configuration software then assigns a device number and writes resource allocations and an I/O base address to each of the devices, and loads device drivers into memory.

Automatic Power Management (APM) is a well-known technology for controlling power to various subsystems in a computer system. In 1996, the advanced configuration and power interface specification (ACPI) was introduced. Among other changes, the ACPI specification introduced operating system directed power management (OSPM). This operating system controlled power management within a computer and also replaced the basic input/output system (BIOS), as well as automatic power management (APM) application interfaces (API), and plug and play configuration processes. Both APM and ACPI use software to control power supplies to buses within the computer system, based on information obtained from devices on the various buses during a configuration phase upon power-up.

The ACPI specification includes four device power states: D3, D2, D1, and D0. Defined in terms of power consumption, device context. device driver, and the restore time, these device power states are not visible to the user. The device power state is recorded within the PCI configuration space for the device. In a D3 state, the operating system assumes the device has lost power. There is no requirement that hardware be provided to remove power from the device. In any case, in a D3 state, the device context has been lost, and so the operating system software has had to reinitialize the device when powering it back on. Since device context and power are lost, devices in this state have not decoded their address lines. Also, devices in the D3 state have the longest restore time.

A D2 state and a D1 state have also been defined for some classes of devices, as intermediate device power states. However, D2 and D1 state definitions have been class specific, and have not been defined across all devices. In the D0 device state, the device has been defined to be fully on, having the highest level of power consumption. The device in a D0 state has been completely activated and is responsive, retaining all relevant context.

The ACPI specification also includes four bus power states: B3, B2, B1, and B0. A bus in a B3 power state is without power, and cannot provide data, control signals, addresses, clock signals, or power supply signals to devices on the bus. A bus in a B0 state is completely operational, and transfers necessary signals among devices on the bus. Buses in the intermediate power states, i.e. power state B2 and power state B1, are defined by the bus manufacturer, but can be expected to provide less than fill bus functionality.

By moving power management into the operating system, ACPI has enabled operating system code to configure motherboard devices according to appropriate power management functions. This has been done while allowing software development of new operating systems independently of hardware development. ACPI has also allowed hardware to develop and ship under older ACPI compatible operating systems, while more current operating systems are under development. However, to provide operating system control over hardware, the operating system typically has polled hardware upon power-up to determine vendor identifier (ID), determine power requirements, and load appropriate drivers. Although the operating system can transition a configured device among various power states, neither the PCI loss of power management specification nor the ACPI specification allows for devices to be added to a system without rebooting the computer system.

SUMMARY OF THE INVENTION

Briefly, the present invention includes a computer system with an ACPI compliant PCI-to-PCI bridge which allows additional devices to be inserted, and allows existing devices to be removed or relocated without restarting the computer. A first PCI bus serves as a local bus, allowing a number of devices, including a PCI-to-PCI bridge, to be connected to the processor of a computer system The first PCI bus also provides power and a clock signal to the PCI-to-PCI bridge and to various other PCI devices located in slots on the bus. The PCI-to-PCI bridge allows expansion by coupling a second PCI bus to the first PCI bus, via the PCI-to-PCI bridge. The second PCI bus includes a number of PCI slots, one of which is coupled to the PCI-to-PCI bridge and receives clock and power signals from the PCI-to-PCI bridge. Other devices may be connected to the second PCI bus by inserting the additional devices into slots in the second PCI bus. Additional PCI buses may be connected to the first and second PCI buses by inserting additional PCI-to-PCI bridges into slots in the PCI buses.

According to the present invention, devices may be added without disabling the entire computer system or rebooting the operating system. Only one PCI bridge subsystem need be disabled, the subsystem to which the new device is to be added, or the subsystem from which a preexisting device is to be removed. The memory of the computer system contains executable code, including a power-down applet and a power-up applet. The power-down applet is user accessible, in that a user can access the applet. For example, the applets may be accessible from an application that allows a user to define system configuration. Alternately, the applets may be invoked via hardware buttons or switches coupled to a PCI-to-PCI bridge.

The power-down applet receives a signal from a user indicating a user desire to insert an additional card into a PCI slot on the second PCI bus. In systems containing multiple PCI buses, the power-down applet also receives an indication identifying the particular PCI bus to which the additional card is to be inserted. Upon receiving the signal, the applet makes a request to the operating system's ACPI software that the bridge device be placed in the D3/B3 state. The operating system then toggles the PCI-to-PCI bridge into a D3/B3 state. A bridge between a first and second bus is in a D3/B3 state when the bridge is in a D3 state, and the second bus is in a B3 state. As discussed in the ACPI specification, a device is in a D3 state when the device is in a low power mode, and a bus is in a B3 state when the bus is in a low power mode.

In the D3/B3 (power down) state, the PCI-to-PCI bridge retains connection to the power supply on the first PCI bridge, and further retains connection to the PCI clock, facilitating subsequent reconnection. However, the PCI-to-PCI bridge separates the second PCI bus from the power supply and clock signal of the first PCI bus, removing power from all of the devices and slots on the second PCI bus. Any PCI-to-PCI bridge on the second PCI bus for connecting a third PCI bus to the second PCI bus is likewise transitioned into a power off (i.e., D3) state.

When power is disconnected from the second PCI bus, a notify signal is provided from the first PCI-to-PCI bridge to the applet or user interface. A notification is provided to the user, who may then insert a card or other device into the PCI slot on the second PCI bus. After inserting the card into the PCI slot on the second bus, the user provides a second indication to the applet or user interface, indicating that the device has been installed. Alternatively, a switch within the PCI slot can detect the presence of the additional card. After the card is inserted, the ACPI software provides a signal to the PCI-to-PCI bridge to enumerate or reconfigure PCI bridge devices on the second PCI bus. Upon re-enumeration, ACPI identifies and configures the additional device in the PCI slot on the second PCI bus.

Thus, by segmenting the system according to PCI bridge implementation structure, a portion of the hardware can be powered down for installation of additional devices. Similarly, devices can be removed from PCI slots on the second PCI bus while the PCI bridge structure is in a powered down state, or moved from one slot to another. Upon reconfiguration, the PCI bridge may assign the same resources or different resources to PCI devices found on the second PCI bus. However, because power is not disconnected from either the processor or main memory, context is not lost and the operating system need not be reloaded. Thus, adding and removing cards to a PCI bridge system is accomplished quickly and efficiently upon receiving an indication from a user, without having to reboot the entire system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
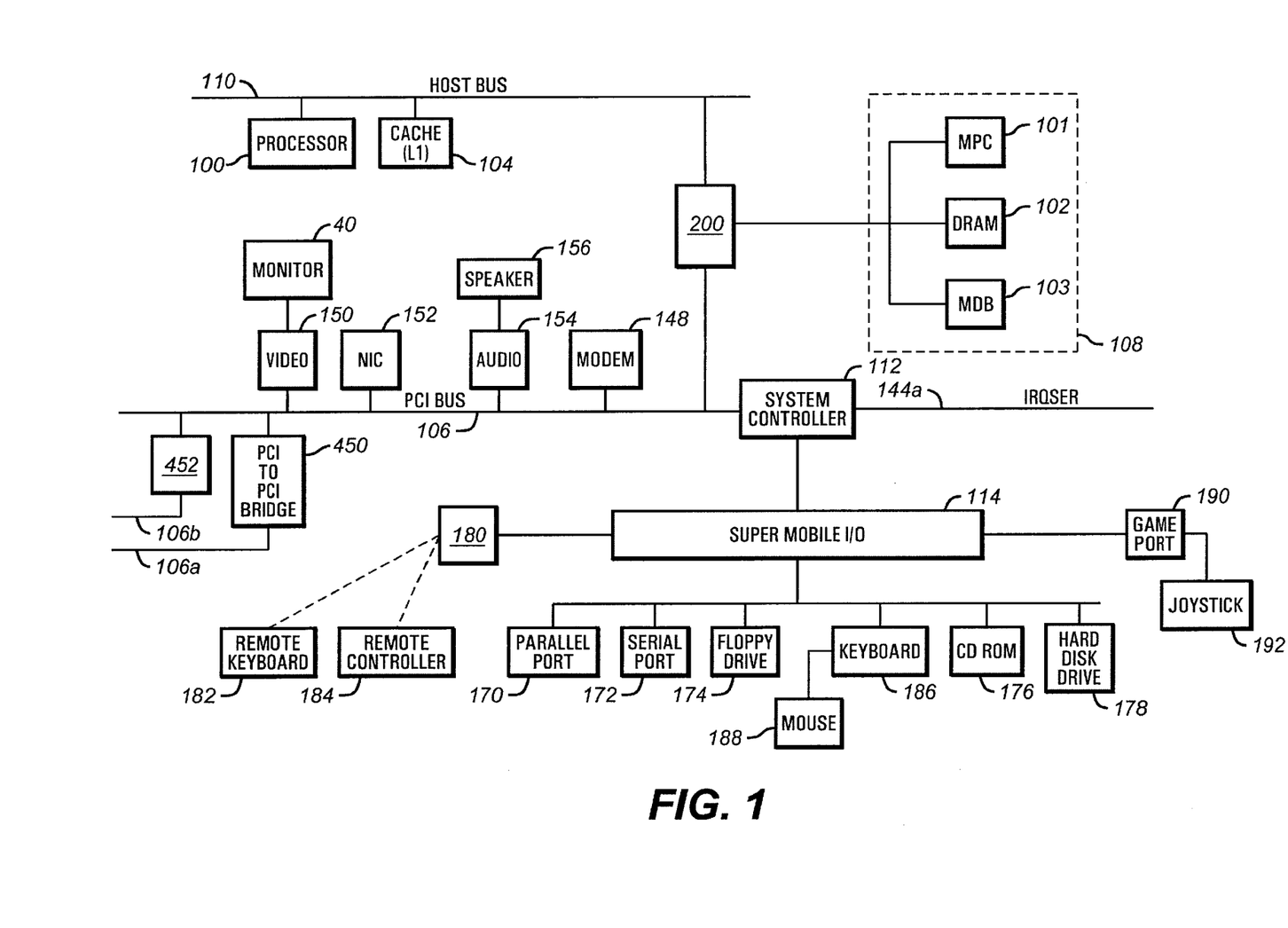
FIG. 1 is a schematic diagram of a typical computer system.

As shown in FIG. 1, a central processing unit 100 is coupled to a host bus 110. The central processing unit 100 may be a single microprocessor, such an Intel Corporation's 486 or Pentium, or a more complete processor system including multiple microprocessors, a cache controller, external co-processors, and other components, coupled to one another or to the host bus 110. The host bus 110 functions to interface the central processing unit 100 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high-speed static RAM structure, addressable within the memory space of the processor's address lines.

Also coupled to the host bus 110 is a memory controller 200, described below in more detail with reference to FIG. 2. The memory controller 200 provides interconnection between the host bus 110, a first PCI bus 106, and a memory bus 210. A main memory 108, typically comprising a dynamic RAM 102, is coupled to the memory bus 210. The main memory 108 provides relatively high-speed data storage for instructions and data needed for the processor to perform its functions.

A system ROM 122, on the main bus (i.e., host bus 110), typically includes the system firmware, including the BIOS and operating system, that are installed automatically when power is applied to the system. The firmware may be run statically from the system ROM, or may be shadowed into system RAM and run dynamically from the RAM. In many computer systems, the hardware configures itself according to the instructions in the BIOS upon power up.

Also coupled to the host bus 110 are three PCI buses. The first PCI bus 106 is an extension bus, coupled to the host bus 110 via the memory controller 200. The PCI bus 106 is coupled to a plurality of additional devices, including the aforementioned video card 150, a network interface controller 152, an audio device or audio card 154, a fax modem 148, and PCI-to-PCI bridges 450 and 452. The video card 150 typically includes a graphics processor and a video graphics adapter, and is coupled to a monitor 40 via a coaxial cable 30 or other computer connector. The audio device or audio card 154 generally is coupled to audio speakers 156 or other audio output device to provide an audio output.

A second PCI bus 106a is coupled via PCI-to-PCI bridge 450 to the first PCI bus 106, providing an extension for additional peripheral components. Also, a third PCI bus 106b is coupled via PCI-to-PCI bridge 450 to the first PCI bus 106, providing an extension for additional peripheral components. The PCI buses 106, 106a, and 106b may alternately be replaced with an X-bus or an ISA bus, or as an EISA bus, a inicrochannel bus, or any of a variety of other bus structures commonly used and known.

Also coupled to the PCI bus 106 is a Super Mobile I/O device 114, via a system controller 112. The Super Mobile 110 device 114 typically has a number of IDE ports to couple external devices. The Super Mobile I/O device 114 may be coupled directly to the central processing unit 100 or to main memory 108, or may be a separate device on the host bus 110. The Super Mobile I/O device 114 provides a connection to a parallel port 170, a serial port 172, a floppy disc drive 174, a keyboard 186 with a mouse 188, a CD ROM 176, a hard disk drive 178, and a remote controller interface 180. The CD ROM 176 provides optical storage and data retrieval capabilities, and the hard disk drive 178 and floppy disc drive 174 provide magnetic storage device capabilities to the computer system.

The Super Mobile I/O device 114, coupled to the first PCI bus 106, provides infrared signal detection, and is optically and remotely coupled to a remote keyboard 182 and a remote controller 184. The remote keyboard 182 and remote controller 184 allow a human user or an external device to communicate data via the remote controller interface 180 to the computer system C, without direct wired connection.

The Super Mobile I/O device 114 also provides connection between the PCI bus 106 and various devices, including a game port 190 coupled to a game pad 138 and to a joy stick 192. Although these devices are shown coupled through the Super Mobile I/O device 114 to the PCI bus 106, it will be recognized that other configurations are possible; for example, the joy stick 192 may instead be coupled to an infrared device for communicating directly to the remote controller interface 180.

It will be recognized that additional devices may be coupled via IDE controllers and other connectors to the various buses, providing resources and buffering for external devices. The flexibility of the computer system therefore is not restricted to the particular example shown in the figure. Moreover, as stated above, additional devices may be added to a computer system via expansion buses, by inserting into a bus slot an expansion card that is connected via a cable or wire to the additional device.

Devices that exchange data with the microprocessor typically are assigned I/O space allocations that may or may not be shared with other devices. Devices include memories, as well as peripheral and other devices. To encode the process of communicating with the devices in the system, the POST typically creates within non-volatile memory an allocation map, allowing a particular device to be identified by an identifier or handle of only a few bits, and a controller translate the handle into an identification of the corresponding resource and by I/O address.

For example, a printer may have an identifier or handle or other brief identifier, a resource such as an interrupt request line, and an I/O space allocation for addressing characters from the microprocessor to the printer. The microprocessor can then address the particular I/O location to send data to the printer, and the printer can use the interrupt request line to indicate a ready to receive data status or a printer-problem status. The map is in the form of a table, and if it is in nonvolatile memory, will start up with the list of resources assigned to configurable installed devices during a previous session.

Figure 2:
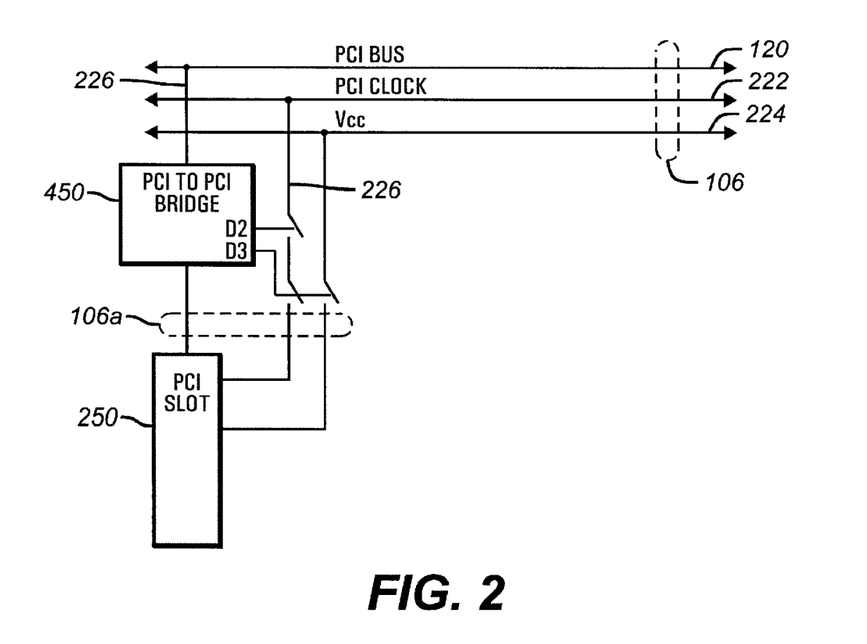
FIG. 2 is a schematic diagram showing a number of PCI-to-PCI bridges and corresponding PCI slots, according to the present invention.

Referring to FIG. 2, a schematic diagram of PCI-to-PCI bridge 452 and corresponding PCI slots according to the present invention is shown. The PCI bridge 450 is of like contribution and operation. The PCI bus 106 (FIGS. 1 and 2), a PCI clock 222 (FIG. 2), and a power supply VCC 224 are coupled to various inputs on the PCI-to-PCI bridge 452. A connection 226 from the PCI bus 120 to the PCI-to-PCI bridge 452 allows control signals, data and addresses to be exchanged between the first PCI bus 106 and the PCI-to-PCI bridge 452.

The second PCI bus 106a is connected to the PCI-to-PCI bridge 452. The second PCI bus 106a receives power and clock information from the first PCI bus 106 via the PCI-to-PCI bridge 452.

Figure 3:
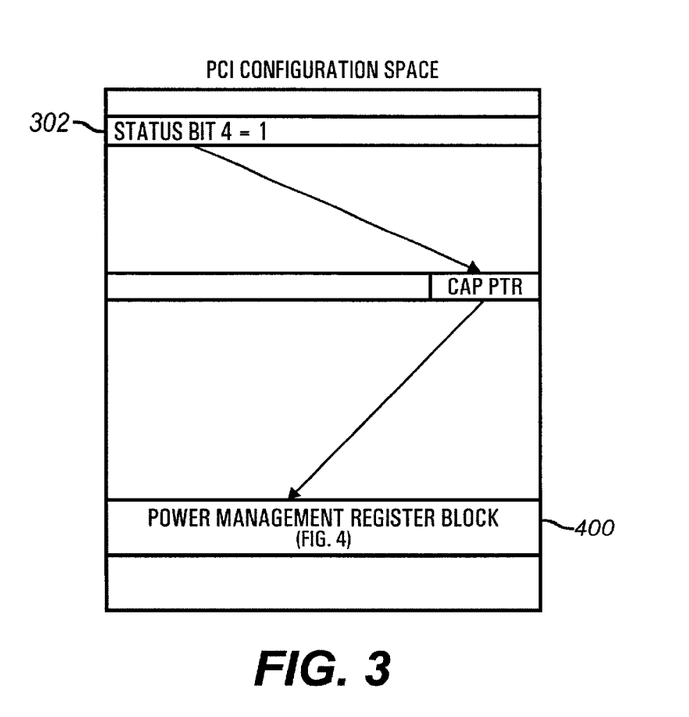
FIG. 3 shows an example of a PCI configuration space according to the present invention.

An applet (not shown in FIG. 2) is configured to set the PCI-to-PCI bridge 452 into one of four power states. The applet is a software routine running on a host processor such as central processing unit 100 that accesses the PCI configuration space (existing in main memory and in various device registers). The applet receives a command, either from hardware (a switch or a button) or software, and alters a power state value in the configuration space corresponding to the PCI-to-PCI bridge 452. The configuration space is shown in FIG. 3. When the first PCI-to-PCI bridge 452 is in a D3 state, power is disconnected from the second PCI bus 106a. Also, clock signals are disconnected in that event from the second PCI bus 106a. When the applet transitions the PCI-to-PCI bridge 452 to the D0 state, power is restored and the bridge devices run normally.

In some embodiments, the first applet is replaced by a switch structured in hardware. For example, the PCI-to-PCI bridge 452, may be configured with an external switch or button for toggling the state of the second PCI bus 106a between the D3/B3 state and the D0/B0 state. In some embodiments, the first applet is alternatively replaced by a detection switch within the PCI bus slots on the second PCI bus 106a, and provides a hardware interrupt upon the insertion of a device into a slot on the second PCI bus 106a.

In some embodiments, the user may indicate via the applet that two or more PCI buses are to be disabled. With the present invention, this is done without interrupting processing that may be underway within the processor or within bus masters or devices on other buses that are not to be disabled. It also occurs without losing active memory context. In such embodiments, the user may move devices from one PCI bus to another, without disabling the computer system. The system clock, for example, and other hardware and software functions remain intact and fully operational, as do devices on buses to which power is not disabled.

Additional applets provide a user interface for indicating that a given bus is to be reactivated. According to some embodiments, a user may reactivate one bus, a particular group of disabled buses, or all buses, without disturbing the operation of the computer system with respect to the local bus or the other buses that have not been disabled. When the user is satisfied that the hardware configuration is as desired, the user indicates this to another applet. The applet responds by writing 00b into the Power Management Control/Status Register corresponding to the appropriate bus.

The second PCI bus 106*a* has at least one PCI slot 250, for receiving expansion PCI cards. The PCI slots 250, and any card inserted into the PCI slot 250, receive power and clock signals from the second PCI bus 106*a*.

Devices and slots in the second PCI bus 106*a* are, of course, disabled when power is disconnected from the system. Traditionally, disconnecting power from the system has preceded insertion or removal of cards from any bus in the system. Disconnecting power has provided a further measure of electrical safety. However, according to the present invention, disconnecting power from the entire system is no longer necessary. These devices and slots are similarly disabled when the PCI-to-PCI bridge 450 to which the second PCI bus 106*a* is connected is in the D3 state. Therefore, when the PCI-to-PCI bridge 450 is in the D3 state, it is safe to insert and remove cards from the PCI slot on the second PCI bus 106*a*.

When the PCI-to-PCI bridge 452 is in the D3 state and a PCI slot receives no power, it is safe to insert and remove cards from the PCI slot. However, when power is applied to the PCI slot, inserting cards can damage the inserted card, the slot and even other devices on the PCI bus. Also, there is a risk that inserting a device into a PCI. slot while power is applied to the slot can damage the PCI-to-PCI bridge 452 and other devices in the system. Therefore, according to the invention, a user powers dowr. the second PCI bus 106*a* by transitioning the PCI-to-PCI bridge 452 into the D3 state before inserting or removing a card from the second PCI bus 106*a*.

Thus, when the PCI-to-PCI bridge 450 is in the D3 state, PCI slots and devices inserted into the PCI slots receive no power. The PCI-to-PCI bridge 450 enters the D3 state in either of two ways. First, the PCI-to-PCI bridge 450 enters the D3 state when the system is turned off. Second, the PCI-to-PCI bridge 450 enters the D3 state, and exits the D3 state when commanded to do so, by the applet.

When commanded to do so by a second applet, the PCI-to-PCI bridge 452 transitions from the D3 state to a D0 state, causing a transition in the second PCI bus 106*a* from the bus power state B3 to the B0 state. The first and second applets may be embodied in the same routine or code. A bus is in a B3 state when the bus is inactive; i.e., carries no current and is disconnected from power supply voltages. A bus is in a B0 state when the bus is fully connected and operational. When the PCI-to-PCI bridge 452 is in the D0 state, power is applied to the second PCI bus 106*a*, and clock signals are provided from the first PCI bus 106 to the second PCI bus 106*a*.

Upon transitioning from the D3 state to D0 state, the PCI-to-PCI bridge 452 restores power to the second PCI bus 106*a*. Enumeration is then performed of the devices on the second PCI bus 106*a* that are inserted into the PCI slots, reallocating PCI bridge network resources on the second PCI bus 106*a* to devices present within PCI slots. Enumeration of devices may be done by the ACPI aware software of the operating system or similar enumeration capable software. The enumeration assigns a unique bridge device identifier to each device on the PCI bus 106*a*. After enumeration, resources are assigned to each device. The resource assignment may be the same as upon a previous configuration, or may be different.

ACPI-aware operating systems include functionality that detects changes to the configuration space and control hardware accordingly. For example, the ACPI-aware operating systems detect transitions from a D3 state to D0 state, and respond by polling the device undergoing such a transition for device type. If appropriate resources are available and unassigned, the ACPI-aware operating system assigns the resources to the device upon the transition. However, if the device type is a PCI-to-PCI bridge, ACPI-aware operating systems automatically respond by enumerating devices on the PCI-to-PCI bridge 450. Thus, such embodiments of the present invention actually take advantage of functionality already included in ACPI-aware operating systems; namely, the ability to enumerate and configure devices on a PCI-to-PCI bridge 450 upon reestablishment of power to the PCI-to-PCI bridge 450.

Of particular interest is the ability of the applet to command the PCI-to-PCI bridge 452 to transition from one state to another, more or less offline. Thus, devices on other PCI-to-PCI bridges on the first PCI bus 106, and devices on the first PCI bus 106 itself, remain operational while a PCI bridge network is taken offline. There is no need to power down the other bridge networks or the system itself, nor to reload and reboot the operating system after a device is installed.

In a hardware embodiment of the present invention, a PCI-to-PCI bridge 452 includes a D3-switch control that is manually programmable. The switch is a physical switch that may be accessed by opening the computer case, or may be external to the computer case. The switch activates the first and second applet, such that bridge devices in slot 250 are disabled while the case is open but the system need not be rebooted when the case is closed.

If desired, the switch is a memory within the PCI-to-PCI bridge 452 itself, programmed by an applet. Locating the switch within the PCI bus itself rather than in the PCI configuration space may have additional advantages in parallel operation, when centralized control (i.e. via the configuration space) is not needed. When the PCI-to-PCI bridge 452 is in the D3 state, the memory is maintained although power is disconnected from the second PCI bus 106*a*. The PCI-to-PCI bridge 452 contains a selectable memory that controls whether the second PCI bus 106*a* is active. In other embodiments, the PCI-to-PCI bridge 450 responds to the PCI configuration space, as described more fully below with reference to FIGS. 3 and 4 and selectively provides connection based on a Power Management Control/Status Register 410.

The D3 switch control provides, in a first state, connection between the Vcc power supply 224 of the first PCI bus 106 and the Vcc power supply 224 of the second PCI bus 106*a*. In a second state, the D3 switch control ensures that power is disconnected between both the first and the second PCI bus.

If desired, the PCI-to-PCI bridge 452 may also include a second D3-switch control that is software programmable. In that case, the two switch controls may be selectable together, or the two switch controls may be independently controllable. The second D3 switch control provides, in a first state, connection between the clock signal 222 of the first PCI bus 106 and the clock signal of the second PCI bus 106a In a second state, the second D3 switch control ensures that the clock signal is disconnected between the first PCI bus 106 and the second PCI bus 106a. Disassociating the clock signals from the power state allows resynchronization without power disconnection.

THE PCI CONFIGURATION SPACE

Referring now to FIG. 3, one example of a PCI configuration space is shown. The PCI configuration space, a data structure residing in active memory, is used by the operating system to identify devices and determine characteristics. The operating system, based on the device type and characteristics, assigns I/O space, memory, direct memory access (DMA), and interrupt resources (IRQ) to the device.

The PCI configuration space of FIG. 3 is a chart depicting schematic allocation of a region within memory of the computer system for storing configuration information. The configuration information includes a portion corresponding to each bus or each device in the computer system. Various applets running on the central processing unit 100 include functions that overwrite the portion corresponding to a particular bus or each device in the computer system, altering the configuration state of the bus or device. In some systems, static reconfiguration is all that is possible and the device or bus is not reconfigured until the entire system is rebooted. However, in more modern systems, dynamic reconfiguration is possible, and the hardware responds automatically to changes in the configuration state stored in memory, without the need to reboot.

If desired, the PCI bridge 452 contains a switch control responsive to the portion of the configuration space pertaining specifically to the PCI bridge 452. As indicated, the portion of configuration space is written by applets that are initiated by user action. The switch control selectively provides connection between the power supply in the first PCI bus 106 and a power supply in the second PCI bus 106a based on the portion of the configuration space that pertains to the bus. In some embodiments, a clock signal is also selectively provided, either controlled along with the power supply or controlled independently.

As shown in FIG. 3, the PCI configuration space includes a number of status bits including a status indicator 302 for a bit 4. If the indicator 302 for status bit 4 is set, then memory also includes another data structure, i.e., a linked list that includes a programmable Power Management Control/Status Register 410 (FIGS. 3 and 4).

Figure 4:
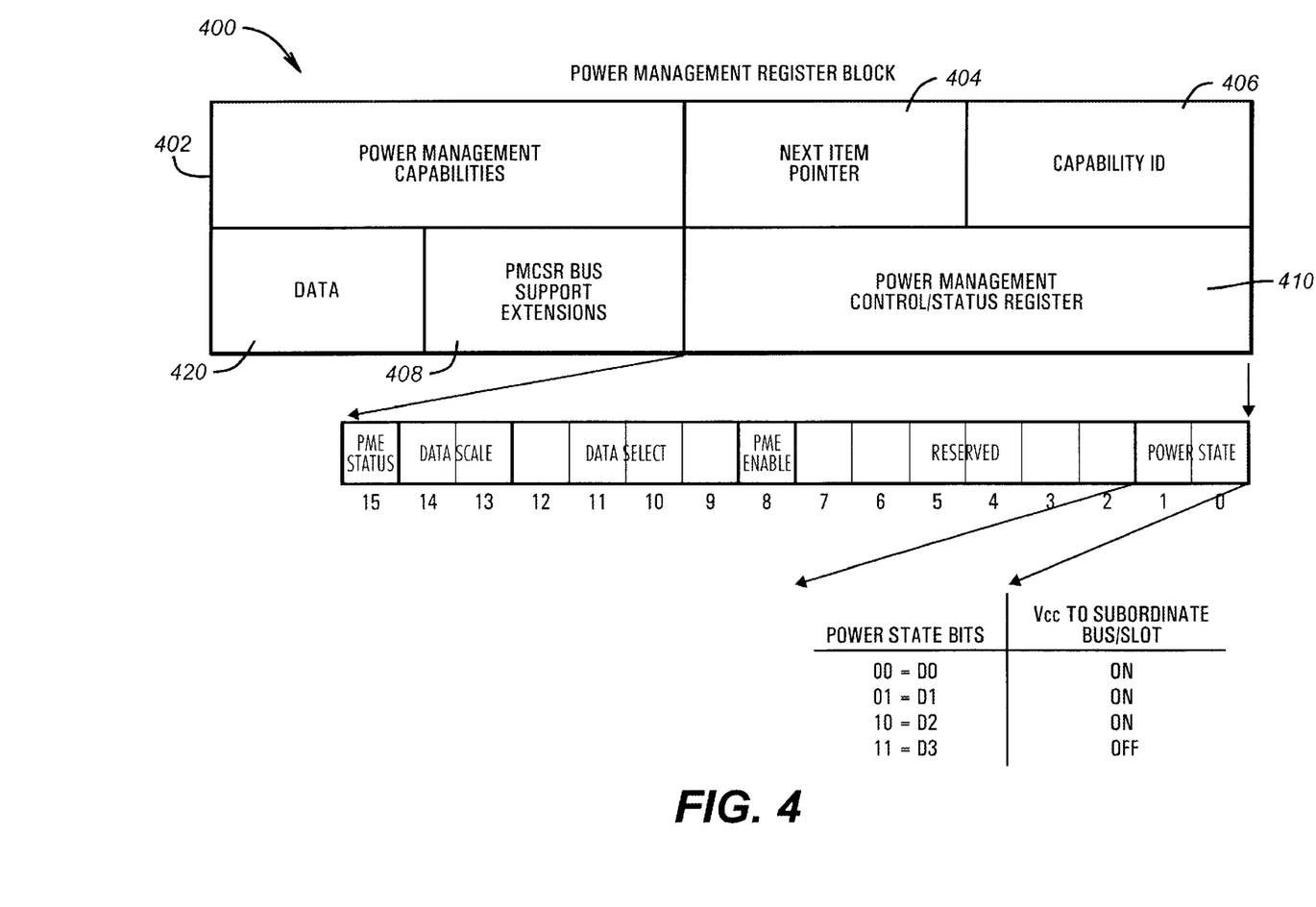
FIG. 4 shows a Power Management Control/Status register of FIG. 3 in greater detail.

Referring now to FIG. 4, the Power Management Register Block 400, including the Power Management Control/Status Register 410 is shown in greater detail. The Power Management Register Block 400 includes a Power Management Capabilities data structure 402, a Next Item Pointer 404, a Capabilities Identifier 406, Power Management Control/Status Register Support Extensions 408, a Power Management Control/Status Register 410 with at least sixteen bits, and Data 420. Bit [15] of the Power Management Control/Status Register 410 is the PME status bit 412. Bits [14:13] of Register 410 define the data scale, and bits [12:9] define data select. Bit [8] defines the PME Enable, and bits [7:2] are reserved.

Bits [1:0] of the Power Management Control/Status Register 410 are used to determine the levels of power management support, and to command bits to change the power usage of the device. Thus, the power supply to each device and bus is software-selectable according to the present invention. By contrast, in the prior art all of the buses in the entire computer system were always in identical power states. A given bus other than the local PCI bus to which the processor is connected may be commanded into a given state by commanding the PCI-to-PCI bridge 450 connecting the given bus to the local bus. According to the second software embodiment of the present invention (implanted within the PCI configuration space), each bus, or each device, in the computer system has a corresponding Power Management Control/Status Register 410, residing within the PCI configuration space in main memory.

Power state bits [1:0] of the Power Management Control/Status Register 410 control power states of various devices according to the following table:

| Power State Bits (Power Management Control/Status Register bits [1:0]) | Power State | Vcc to Subordinate Bus/Slot |
|---|---|---|
| 00b | D0 | On |
| 01b | D1 | On |
| 10b | D2 | On |
| 11b | D3 | Off |

A PCI bus enters a B3 state when the PCI-to-PCI bridge 452 connecting it to the local PCI bus enters a D3 state. The PCI-to-PCI bridge 450 and the bus, respectively, are referred to as being in a D3/B3 state. Thus, an applet of the present invention receives information from a user indicating a desire to alter the configuration of a PCI bus. Such desired alteration may include adding a device, removing a device, moving a device from one slot to another, substituting a new device for a device currently on the bus, or a combination of the above. The applet responds by writing a 11b to the least significant bits of the Power Management Control/Status Register 410 corresponding to the particular bus, e.g. the second PCI bus 106a, transitioning the PCI-to-PCI bridge 452 and the second PCI bus 106a to a D3/B3 state. The hardware responds by disabling the second bus 106a, but leaving power and clock on the primary (local) PCI bus 106 to the PCI-toPCI bridge 240 itself, facilitating subsequent recovery. No other bus or device in the computer system need be disabled; the processor continues to process information, other bus masters continue to issue bus access requests, and direct memory access (DMA) and hardware and software interrupts proceed normally. Only the particular bus 106a, and devices on the particular bus 106a, corresponding to the Power Management Control/Status Register 410 having the 11b in the least significant bits are disabled. In some embodiments, a notification is provided to the user indicating that power has been disabled to the indicated bus.

Once power is disabled to the given bus, the user alters the device configuration on the bus. For example, the user may add a device to the bus or remove a device from the bus. The user may add another PCI-to-PCI bridge 240, allowing futher expansion of the computer system. The user may add other types of buses, as weli. The user may move a device from one slot to another, or may substitute a new device for a device currently on the bus. The user may also perform a combination of the above.

Figure 5:
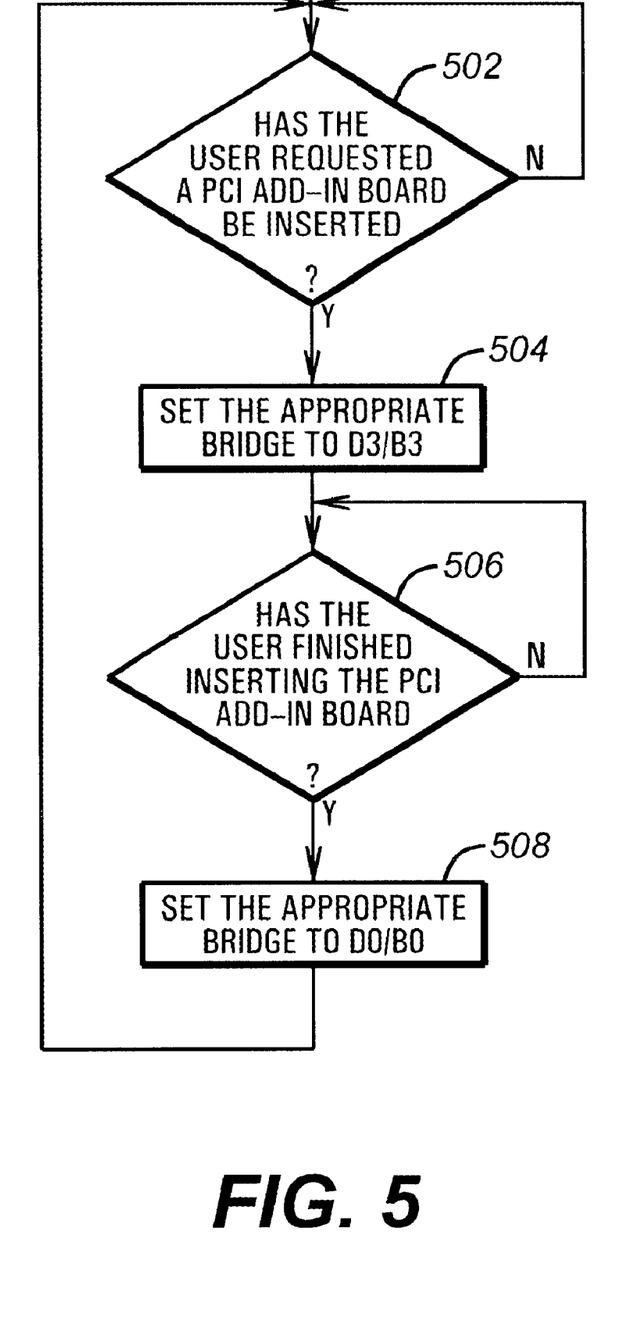
FIG. 5 is a flow chart showing a method of operating the system of FIGS. 1 and 2 according to the present invention.

Referring now to FIG. 5, a flow chart showing one method according to an embodiment of the present invention is shown. Initially, a computer system operates normally. At step 502, the method identifies whether a user has requested a PCI add-in board to be inserted. The request from a user can be indicated in a number of ways. For example, the request can be indicated by a hardware interrupt, for example by a user removing a cover to a computer system case protecting a particular PCI bridge network while the computer is running. Alternatively, a user may indicate the request through software, for example by clicking on an icon in a graphical user interface, or by launching an application requiring a particular device. An example of the latter situation would be a launching of a teleconferencing or internet application, in which the system has no network interface controller. By identifying a PCI slot that is vacant, the application can instruct a user to insert a card in the appropriate slot.

In step 502, if the user has not requested a PCI add-in board to be inserted, operation of the computer system continues normally. However, if the user has requested a PCI add-in card to be inserted, and the appropriate PCI bridge has been identified at step 504, the appropriate bridge is transitioned to a D3/B3 state. In the D3/B3 state, the PCI bridge itself remains active and capable of receiving instructions from the first PCI bus 106, although power is disconnected from the second PCI bus 106a connected to the PCI bridge. Disconnecting power from the second PCI bus 106a on the bridge is referred to as a B3 state.

A user then inserts a first card into a vacant PCI slot on the PCI bus in a B3 state. The user also removes a pre-existing second card from the PCI bus, and replaces a third PCI card with a fourth PCI card.

In step 506, the user indicates that inserting PCI add-in cards and otherwise restructuring the PCI bridge network is completed At step 508, the appropriate bridge is transitioned from the D3/B3 state to the D0/B0 state. Transitioning the bridge in this manner will cause the operating system to re-enumerate and re-arbitrate the device. In one embodiment of the present invention this transition is commanded by the applet, although in other embodiments the transition could be accomplished upon closing a cover to a computer system case. Power is restored to the second PCI bus 106a, and a bus enumerator is initiated for reconfiguring devices on the second PCI bus 106a. Resources are assigned as needed to the second PCI bus 106a devices found on the second PCI bus 106a. Conflicting devices are arbitrated as necessary.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:
   a processor for executing instructions;
   a memory having a set of instructions that, when executed by the processor, provide a bus power-down signal, the memory further contains:
      a region for storing configuration information, the configuration information corresponding to a bus in the computer system; and
      a first set of instructions that, when executed by the processor, overwrites a portion of the configuration information;
   a first PCI bus, coupled to the processor;
   a PCI bridge, coupled to the first PCI bus, for receiving the bus power-down signal; and
   a second PCI bus, coupled to the PCI bridge, the second PCI bus having a PCI slot for receiving a PCI bridge device, the second bus receiving power when the power-down signal is not asserted and not receiving power when the power-down signal is asserted, the second PCI bus further contains:
      a switch control responsive to the portion of the configuration information, the switch control selectively providing connection between a power supply in the first PCI bus and a power supply in the second PCI bus based on the portion of the configuration information.

2. The computer system of claim 1, further comprising:
   a PCI bridge device, coupled to the PCI slot of the second PCI bus.

3. The computer system of claim 1, wherein:
   the first PCI bus includes a PCI clock signal and a PC1 power supply signal; and
   the second PCI bus receiving both power supply signal and the clock signal when the power-down signal is not asserted and not receiving either the power supply signal nor the clock signal when the power-down signal is asserted.

4. The computer system of claim 1, wherein:
   the second PCI bus further contains a switch control responsive to the portion of the configuration information, the switch control selectively providing connection between a clock signal in the first PCI bus and a clock signal in the second PCI bus based on the portion of the configuration information.

5. The computer system of claim 1, wherein:
   the memory futher contains:
      a second set of instructions that, when executed by the processor, selectively controls the second PCI bus based on the portion of the configuration information, selectively providing connection between a power supply in the first PCI bus and a power supply in the second PCI bus based on the portion of the configuration information.

6. The computer system of claim 1, wherein:
   the first set of instructions includes a user interface for receiving from a user a first indication of the user's desire to reconfigure the second PCI bus.

7. The computer system of claim 6, wherein:
   the second set of instructions includes:
      a notification to a user of a power-down state of the second PCI bus;
      a user interface for receiving from a user a second indication of the user's desire to reconfigure the second PCI bus; and
      a functionality for enumerating devices on the second PCI bus.

8. A PCI-to-PCI bridge, configured to be coupled to a computer system having a processor for executing instructions, a memory having a set of instructions that, when executed by the processor, provide a bus power-down signal, a first PCI bus, coupled to the processor, and a second PCI bus, the second PCI bus having a PCI slot for receiving a PCI bridge device, the PCI bridge comprising:
   the first PCI bus including a first PCI clock signal;
   the first PCI bus including PCI clock signal;
   internal logic configured for selectively connecting power-down signal from the first PCI bus to the second PCI bus internal logic is further configured for selectively connecting the clock signal from the first PCI bus to the second clock signal of the second PCI bus;

a first connector, coupled to receive a bus power-down signal from the first PCI bus;

a second connector, coupled to provide the bus power-down signal to the second PCI bus, such that the second PCI bus receives power when the power-down signal is not asserted and does not receive power when the power-down signal is asserted;

a third connector, for receiving the first clock signal from the first PCI bus; and a fourth connector, for providing the second clock signal to the second PCI bus, such that the second clock signal of the PCI bus is synchronized to the first clock signal of the first PCI bus when the power-down signal is not asserted and may not be synchronized when the power-down signal is asserted.

9. In a computer system having a processor for executing instructions, a memory having instructions, a first PCI bus coupled to the processor, a PCI bridge coupled to the first PCI bus, and a second PCI bus coupled to the PCI bridge, the second PCI bus containing a switch control, a method comprising the steps of:

identifying the second PCI bus;

when the second PCI bus is in a power-up state, receiving a first indication to transition the second PCI bus into a power-down state;

in response to the first indication, generating to the switch control a power-down signal corresponding to the second PCI bus, responsive to the power-down signal the switch control transitioning the second PCI bus into a power-down state without transitioning the first PCI bus into a power-down state;

when the second PCI bus is in a power-down state, receiving a second indication to transition the second PCI bus into a power-up state; and after receiving the second indication, generating to the switch control a power-up signal corresponding to the second PCI bus, responsive to the power-up signal the switch control transitioning the second PCI bus into a power-up state.

10. The method of claim 9, further comprising a step of:

when the second PCI bus is in the power-down state, adding a device to a slot in the second PCI bus.

11. The method of claim 9, further comprising a step of:

when the second PCI bus is in the power-down state, removing a device from a slot in the second PCI bus.

12. The method of claim 9, further comprising steps of:

identifying a third PCI bus;

when the third PCI bus is in a power-up state, receiving an indication to transition the third PCI bus into a power-down state;

in respond to the indication, generating a power-down signal corresponding to the third PCI bus, transitioning the third PCI bus into a power-down state without transitioning the first PCI bus into a power-down state;

when the second PCI bus and the third PCI bus are in the power-down state, moving a device from a slot in the second PCI bus to a slot in the third PCI bus;

when the third PCI bus is in a power-down state, receiving a second indication to transition the third PCI bus into a power-up state;

after receiving the second indication, generating a power-up signal corresponding to the third PCI bus, transitioning the third PCI bus into a power-up state.

* * * * *